(12) United States Patent
Northrup et al.

(10) Patent No.: US 8,728,424 B1
(45) Date of Patent: May 20, 2014

(54) METHOD AND APPARATUS FOR CARBON DIOXIDE SEQUESTRATION

(75) Inventors: Robert P. Northrup, Dallas, TX (US); Dwight Hunter Washburne, Dallas, TX (US); Lynn L. Northrup, Jr., Dallas, TX (US)

(73) Assignee: Lynn L. Northrup, Jr., Incorporated, Dallas, TX (US)

( * ) Notice: Subject to any disclaimer, the term of this patent is extended or adjusted under 35 U.S.C. 154(b) by 475 days.

(21) Appl. No.: 12/943,913

(22) Filed: Nov. 10, 2010

(51) Int. Cl.
*B01D 53/62* (2006.01)
*B01D 53/96* (2006.01)

(52) U.S. Cl.
USPC ............................ 423/224; 423/220; 423/230

(58) Field of Classification Search
USPC ........................................ 423/220, 224, 230
See application file for complete search history.

(56) References Cited

U.S. PATENT DOCUMENTS

| | | | |
|---|---|---|---|
| 4,474,524 A * | 10/1984 | Kawakami et al. | 414/213 |
| 4,800,003 A * | 1/1989 | Peacey et al. | 205/404 |
| 6,294,135 B1 * | 9/2001 | Joo et al. | 422/173 |

FOREIGN PATENT DOCUMENTS

JP 06-114238 * 4/1994 ............. B01D 53/34

OTHER PUBLICATIONS

Yabe, T. et al., "Noncatalytic dissociation of MgO by laser pulses towards sustainable energy cycle." J. of Applied Physics, vol. 101, 123106 (2007) (7 pages). Published online on Jun. 22, 2007.*

* cited by examiner

*Primary Examiner* — Stanley Silverman
*Assistant Examiner* — Daniel Berns
(74) *Attorney, Agent, or Firm* — Mark W. Handley

(57) ABSTRACT

A method and apparatus are disclosed for sequestering carbon dioxide. Carbon dioxide and a reductant are fed into a combustion chamber and burned. The reductant forms an oxide with oxygen from the carbon dioxide, generating an oxidized reductant and carbon which are exhausted from the combustion chamber and separated. The oxidize reductant is then itself reduced to form reclaimed reductant, which is used to provide the reductant for reducing the carbon dioxide. The oxidized reductant is reduced by disposing the oxidized reductant in an inert environment and exposing the oxidized reductant to electromagnetic radiation of a wavelength for freeing oxygen from the oxidized reductant. The electromagnetic radiation is preferably provided by light having a wavelength which is readily absorbed by oxygen, such as light emitted by a YAG laser. Preferably the reductant is provided by a metal, such as magnesium.

16 Claims, 7 Drawing Sheets

METHOD AND APPARATUS FOR CARBON DIOXIDE SEQUESTRATION

TECHNICAL FIELD OF THE INVENTION

The present invention relates in general to carbon dioxide sequestration, and in particular to a net energy-producing process for sequestering elemental carbon from carbon dioxide.

BACKGROUND OF THE INVENTION

Sequestering carbon dioxide, a goal of international agreements and the U.S. Environmental Protection Agency, is a new field generally involving geological or other mass depositions. An even newer field is to develop useful products from captured carbon dioxide. To date, most attention has been focused on sequestering carbon dioxide ($CO_2$) in organisms such as algae. The organisms are usually then processed into fuels and combusted. One major shortfall of this is that it is, at best, carbon neutral. Another major shortfall is that, given known efficiencies of photosynthesis and carbohydrate synthesis, no organism can produce cost-competitive fuels with current methods and fuel prices. A more viable method of carbon dioxide sequestration is creating carbonates, such as calcium or magnesium carbonate for cement, but this is limited to where it is economical to pump large amounts of seawater, and/or $CO_2$, and requires energy. Presently, no current system can sequester $CO_2$ on-site, within the extant confines of a normal $CO_2$ emitting facility. No current system produces by-products of direct use to the power plant.

SUMMARY OF THE INVENTION

A novel method and apparatus for carbon dioxide sequestration is disclosed. Carbon dioxide is reduced to elemental carbon by combustion of carbon dioxide and a reductant, separation of combustion products, and recycling of the oxidized reductant. The process preferably utilizes a high purity of carbon dioxide, a reductant of sufficient strength to reduce the carbon dioxide, and centripetal separation of combustion products or an organic, aqueous phase separation of combustion products. Reduction of oxidized reductant for re-use is preferably accomplished by use of focused electromagnetic radiation. Improved reduction yields are preferably accomplished by utilizing a series of conical, centripetal separation vessels as the location of solar-driven reduction chemistry. Combustion is regulated by by means of a pump to create a steady $CO_2$-gas fluidized-bed of metallic reductant. Preferably, heat generated during heat-producing stages of the present invention is used to heat a working fluid to make use of the generated heat.

Metals ("M") are often strong reductants. Strong reductants of $CO_2$ include the metals Lithium, Magnesium, Aluminum, and Boron. Metals are intentionally oxidized for rocket propulsion, but otherwise are not favored fuel sources, as they are costly and their combustion is difficult to control. Carbon dioxide ($CO_2$) is not generally used for oxidizing metals, as oxygen is normally available. However, the National Aeronautics and Space Administration (NASA) has recently taken an interest in $CO_2$ for Mars missions, as the Martian atmosphere is 95% $CO_2$, and since the 1960s NASA has reliably controlled metal combustion by injecting metal powder with a Positive Displacement Fluidized Bed (PDFB) feeder. However, the fuel is simply blown out of the rocket engine, therefore in $CO_2$ sequestration there is a need for a method of collecting and separating components of the exhaust: Carbon (C), $CO_2$, CO and oxidized metal ("MOx").

Ranque-Hilsch counterflowing vortex tubes are known for temperature and chemical mixture separation. Their capacity to separate out pressurized flows has been well documented, and designs have been made to improve on this function. Adiabatic expansion by lighter molecules or atoms towards a vortex in the center of the tube, plus mixing of this inner vortex with the dense layer at the walls of the tube, results in separation of lighter and heavier elements. A variation on this principle is found in "cyclone" separators, used to filter air in workshops and isolate powders in dairy and other industries. Carbon, $CO_2$, and CO are significantly less-dense than MOx, therefore vortex tubes provide one method for their separation.

Oxidized metals are hygroscopic, meaning they have affinity for water, whereas carbon under moderate conditions is hydrophobic, meaning it repels water. Another possible method for separation of MOx from C is to add the mixture to water. For example, the reaction of magnesium oxide (MgO) with $H_2O$ forms $Mg(OH)_2$, known commonly as "milk of magnesia," which can be converted back to MgO by dehydration. Depending on the size and configuration of carbon molecules, carbon either floats above water—as with hydrocarbons—or sinks out. In a mixture with a saturated, dense solution of aqueous $Mg(OH)_2$, carbon floats. In chemistry, this is known as a "phase-separation."

Once MOx and C are separated out, MOx needs to be recycled to M. Oxygen absorbs electromagnetic radiation strongly at wavelengths of 577, 630, 1064 nanometers, as well as at other frequencies. Dichroic mirrors separate light into bandwidth ranges, and could be used to isolate those narrowed bandwidths that contain oxygen absorption peaks. Yttrium aluminum garnet ("YAG") lasers emit light at 1064 nm, and thus can be used to focus intensified electromagnetic radiation in the form of light on the oxygen in MOx. Sufficient light absorption rapidly excites oxygen until the bond with the metal is broken. Provided oxygen is rapidly cooled in an inert environment, that is, in the presence of an inert gas, M and oxygen can remain separate.

One way of gaining the energy to radiate oxygen at its 1064 nm absorption peak is by solar-"pumping" a YAG laser. A "solar tower" is a system that uses a field of heliostats to focus light onto a mirror atop a tower that reflects the light down to a boiler, or focuses light through an annular space into a light-trapping and absorbing heat exchanger, or into a compound parabolic collector(s). Some solar tower systems separate the focused light out for different purposes. For example, one proposed array would have a field of heliostats focused onto a hyperboloid mirror which, in one arrangement, was dichroic, with a bandwidth passing through onto photovoltaics in the tower head, and a bandwidth reflected down to a compound parabolic concentrator at the base. In another, the hyperboloid mirror bounces light down to a dichroic mirror, which passes a bandwidth of the light onto compound parabolic concentrators at the base, and reflected a bandwidth of the light onto photovoltaics. For the end of pumping a YAG laser, any similar configuration could be used, provided the YAG absorption bandwidth reached the laser.

A pure stream of $CO_2$, desirable for most forms of carbon dioxide sequestration, may come from ammonium or other solvents used to "scrub" $CO_2$ from smokestacks. Preferable, however, is $CO_2$ from chemical looping combustion, which also has the potential advantage—within the proposed process—of synergistically sharing its metal fuel with a solar reducing system, and allows for on-site management of reductant.

DESCRIPTION OF THE DRAWINGS

For a more complete understanding of the present invention and the advantages thereof, reference is now made to the following description taken in conjunction with the accompanying Drawings in which

FIG. 1 illustrates a schematic flow diagram of an apparatus in which an overall process for carbon dioxide sequestration in accordance with the present invention is employed with a counter-flowing vortex tubes for combustion product separation;

FIG. 2 illustrates a schematic flow diagram of an apparatus employing a process in accordance with the present invention in which combustion products are separated by solvation and gravity separation followed by dehydration;

FIG. 3 illustrates a schematic flow diagram of an apparatus of one embodiment of the present invention, employing a process utilizing four or more counter-flowing vortex tube separators in succession;

FIG. 4 illustrates a schematic flow diagram of an apparatus according to one embodiment of the present invention, employing a process in which sunlight is used to pump a laser and the apparatus also including counter-flowing vortex separators;

FIG. 5 illustrates a schematic flow diagram of an apparatus utilizing according to one embodiment of the present invention, employing sunlight that is split by a dichroic mirror to both pump a laser and power a boiler or photovoltaic, and counter-flowing vortex separators;

FIG. 6 illustrates a schematic flow diagram of an apparatus according to one embodiment of the present invention employing sunlight that is split by a dichroic mirror to both pump a laser and be directed into the counter-flowing vortex separators; and FIG. 7 illustrates a flow chart of a process for sequestering carbon dioxide in accordance with the present invention.

DETAILED DESCRIPTION OF THE INVENTION

Figure 1:
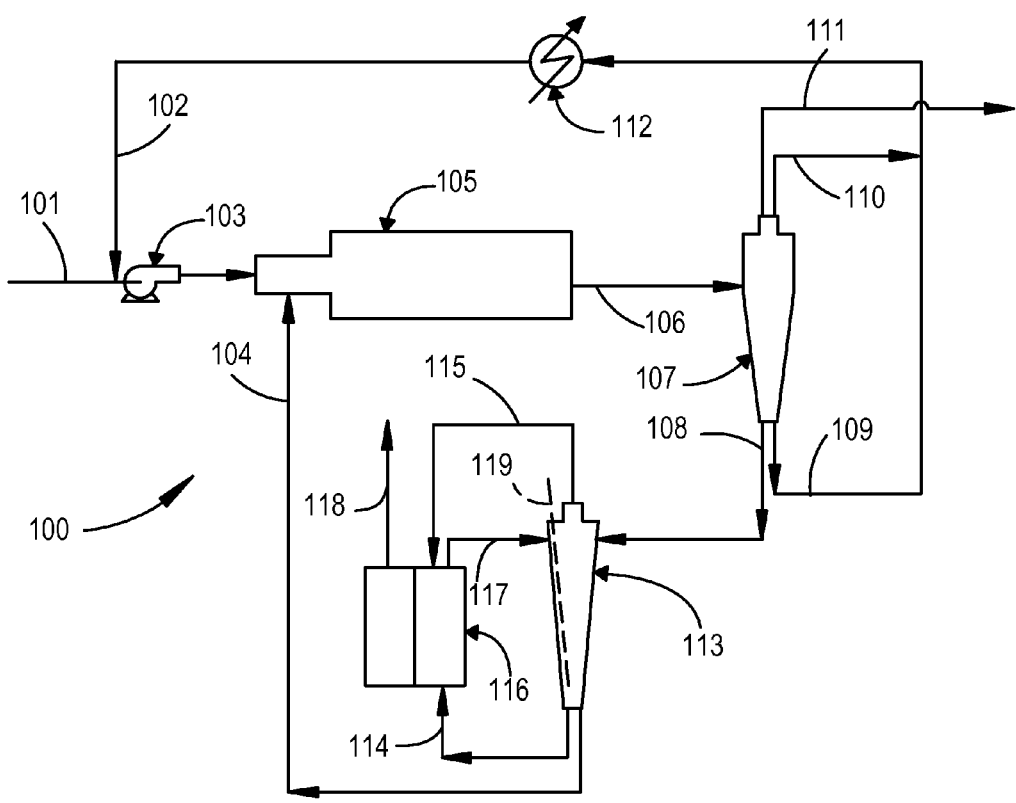
FIGS. 1 through 7 show various aspects for a method and apparatus for carbon dioxide sequestration made according to the present invention, as set forth below.

Referring to the Figures, FIG. 1 is a schematic diagram of an apparatus 100 for sequestering carbon dioxide in accordance with the present invention, using counter-flowing vortex tubes for combustion product separation and reclamation for re-use in the combustion process. A flow of carbon dioxide from an external source travels along a flow line 101 and is combined with carbon dioxide and carbon monoxide from a flow line 102. The flow line 102 passes carbon dioxide and carbon monoxide which has not been reduced in the apparatus 100, and thus is being looped back through the apparatus 100. A pump 103, or a compressor, pressurizes the carbon dioxide and carbon monoxide for passing into a combustion chamber 105. A flow line 104 passes a reductant, or reducing agent, into the combustion chamber 105 for mixing and combusting with the carbon dioxide and carbon monoxide feed from the pump, or compresson, 103. The reductant may be fed into the combustion chamber as a pressurized liquid or as a solid powder, and preferably is a metal such as magnesium which will combust and form an oxide with the oxygen from the carbon monoxide and carbon dioxide feed from the pump 103. Exhaust from the combustion chamber 105 preferably passes through a flow line 106 and into a vortex tube separator 107.

The vortex tube separator 107 is preferably of a counter-flowing type for receiving the exhaust gases from the combustion chamber 105 and using centripital force to separate materials of different densities and weights, such as oxidized reductant, elemental carbon, carbon monoxide and carbon dioxide. Elemental carbon exits from the fine end of the separator through the flow line 111. The elemental carbon is freed by reduction of the carbon dioxide and the carbon monoxide. The portion of the carbon dioxide and the carbon monoxide which are not reduced in the combustion chamber 105 will pass through the flow line 106 and into the separator 107, and then from separator 107 through the flow lines 109 and 110. The flow lines 109 and 110 pass the non-reduced carbon monoxide and carbon dioxide through a heat exchanger 112 and into the flow line 102. The heat exchanger 112 preferably removes heat from the flow line 102. The carbon monoxide and carbon dioxide from the separator 107 will then mix with the carbon dioxide passing through the flow line 101 and into the apparatus 100, for again mixing with the reductant feed from the flow line 104 and burning in the combustion chamber 105. Oxidized reductant will pass from the course end of the separator 107, through the flow line 108 and into a counter-flowing vortex separator 113.

The vortex separator 113 is provided for reclaiming the oxidized reductant burned in the combustion chamber 105. In the vortex separator 113 the oxidized reductant is itself reduced after sufficient exposure to electromagnetic radiation 119. The vortex separator 113 receives the oxidized reductant from the flow line 108 connecting between the separator 107 and the separator 113. An inert gas passes from a flow line 117 and into the separator 113 and provides an inert atmosphere around the oxidized reductant within the separator 113. Electromagnetic radiation 119 is passed into the separator 113 for reducing the oxidized reductant in the vortex separator 113. A discharge stream of oxygen and inert gas passes from the vortex, or fine particle end, of the separator 113 and through the flow line 115 into a gas separator 116. A fraction of the oxygen and inert gas pass from the course end of the separator 113, through the flow line 114 and into the gas separator 116. Reductant is reclaimed in the vortex separator 113 and will pass from the course end of the separator 113, through the flow line 104 and back into the combustion chamber 105 to reduce carbon dioxide and any remaining carbon monoxide. In some embodiments, more than one vortex separator 113 may used rather than a single separator 113, such as successive centripetal counterflowing vortex reduction/separation vessel(s) (depicted in FIGS. 4, 5 and 6). The recycled inert gas passes through the flow line 117. The reductant may be in the form of a pressurized liquid or as a solid powder. Preferably, magnesium metal is used for the reductant.

The gas separator 116 is provided for receiving a mixture of the inert gas and oxygen from the flow lines 114 and 115, and separating out purified inert gas for passing through the flow line 117 for re-use in the vortex separator 113, and oxygen for passing through the flow line 118 as a product of the apparatus 100. The gas separator 116 may be provided by a pressure-swing adsorption type separator, or a cryogenic distillation unit, as are well known to those skilled in the related art.

Figure 2:
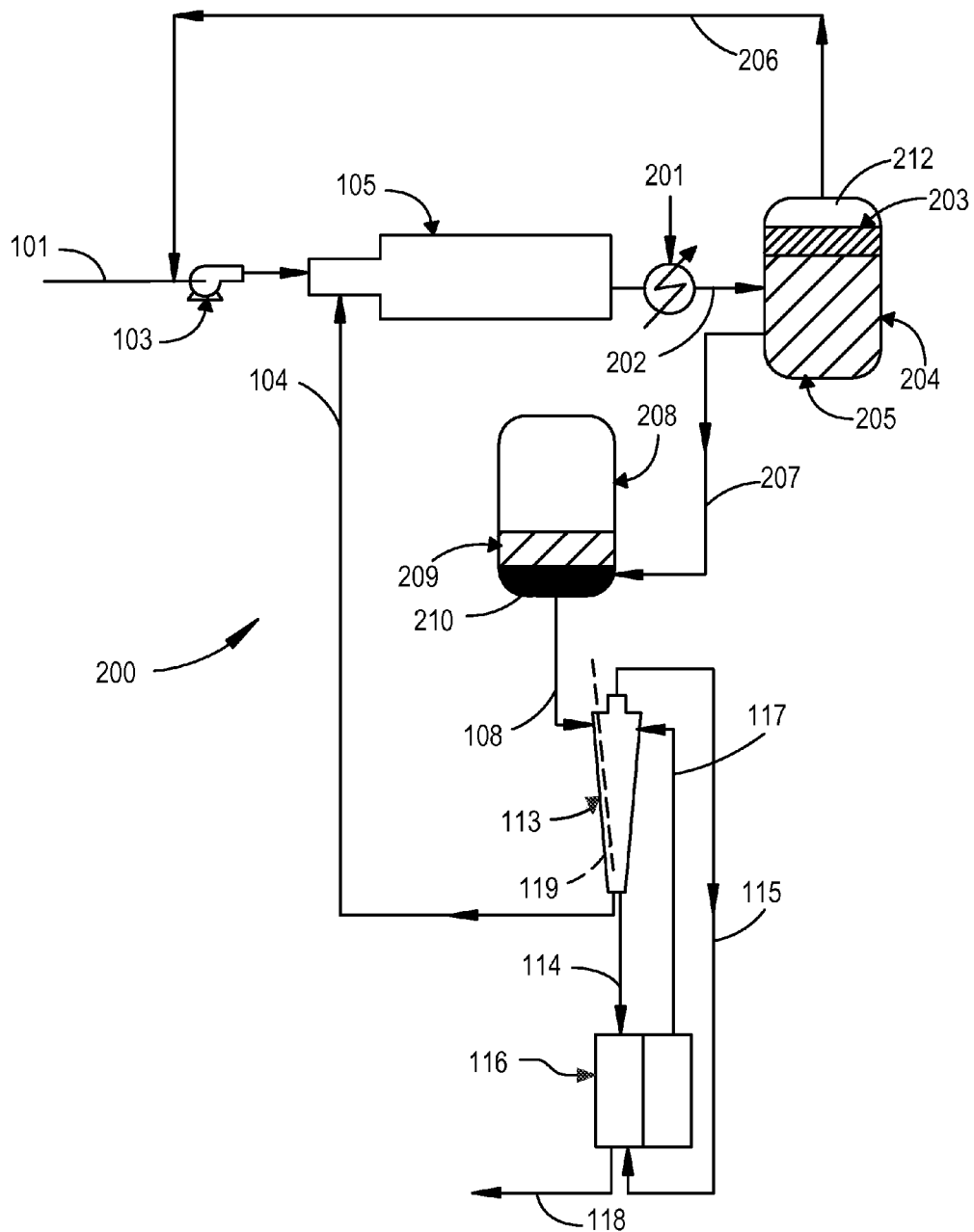

FIG. 2 is a schematic diagram of an apparatus 200 for sequestering carbon dioxide in accordance with the present invention, and reclaiming combustion products for re-use in the combustion process using solvation and gravity separation followed by dehydration. Similar to FIG. 1, carbon dioxide passes into the apparatus 200 along the flow line 101, and is mixed with a mixture of carbon dioxide and carbon monoxide which is passed along the flow line 206. A pump 103, or compressor, passes the mixture into the combustion chamber 105. Reductant passes along a flow line 104 for mixing with the carbon dioxide and carbon monoxide in the combustion chamber 105. Combustion products from the combustion chamber 105 pass through a heat exchanger 201, and then through the flow line 202 and into a separation tank 204. Heat is removed from the combustion products in the heat exchanger 201.

The combustion products are mixed with water in the separation tank 204. In the separation tank 204, unreduced carbon dioxide and partially reduced carbon monoxide gases will separate from solids and liquids, and then will be removed along the flow line 206 for mixing with carbon dioxide passing through flow line 101 and into the pump 103. Elemental carbon from the reduced carbon dioxide and carbon monoxide will settle in a region 203 and is removed from an upper surface of a liquid phase region 205. The oxidized reductant is solvated in liquid, preferably water, and being of greater density than the elemental carbon, will form an aqueous phase in the liquid region 205 with the lower-density elemental carbon floating above in the region 203. Preferably, the aqueous phase is drained from the region 205 and passes along a flow line 207 to a separation tank 208. In some embodiments, more than one separation tank 204 may be used. Separation may proceed as a batch process to drain the aqueous phase from the region 205, followed by removal of the solid 203, or as a continuous process with the aqueous phase slowly drained from the region 205 and the solid phase skimmed from the region 203 located above the region 205. Gas collects in the ullage 212 above the region 205, and passes through the flow line 206 and back into the combustion chamber 105.

Figure 4:
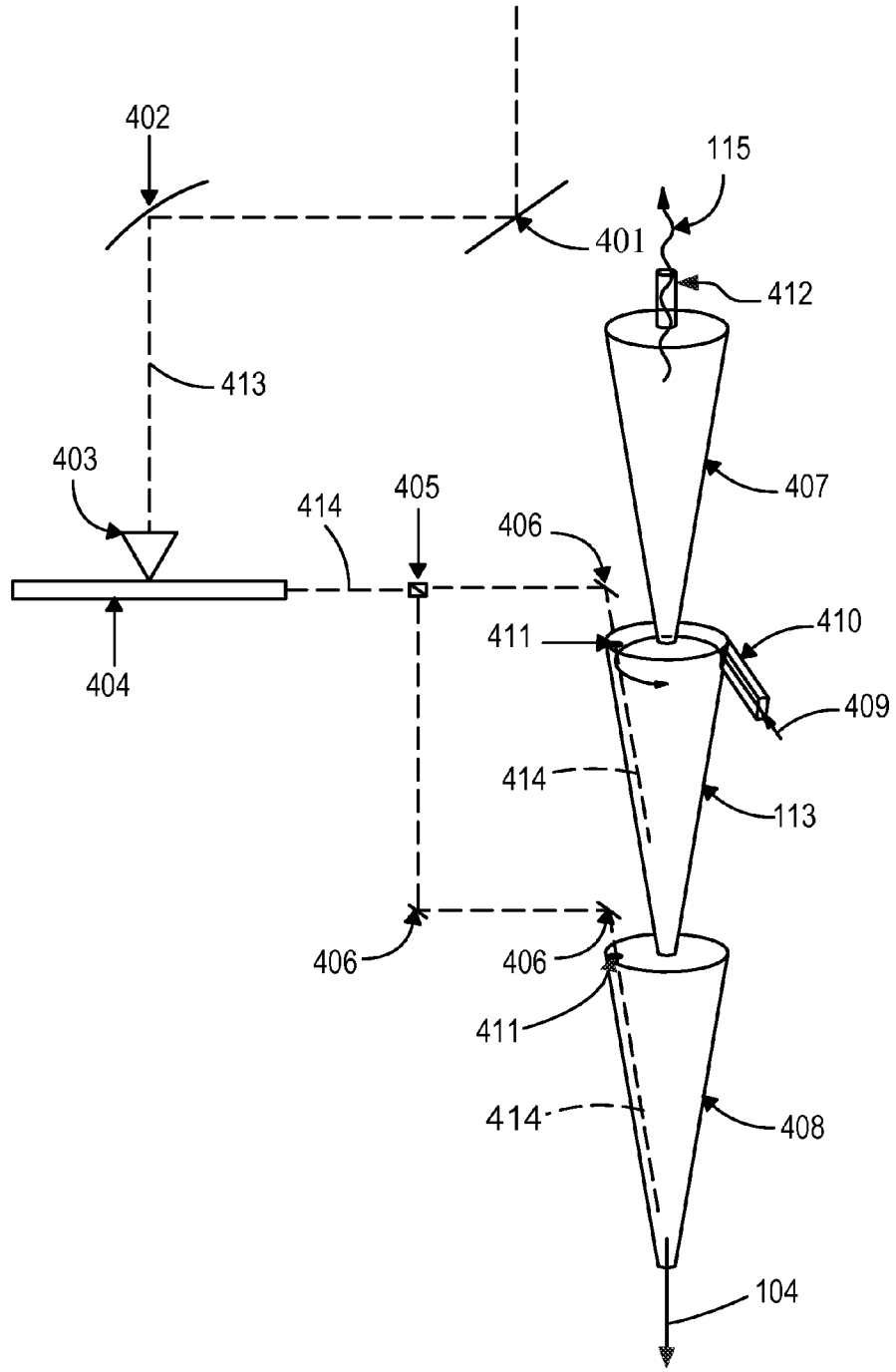
Figure 5:
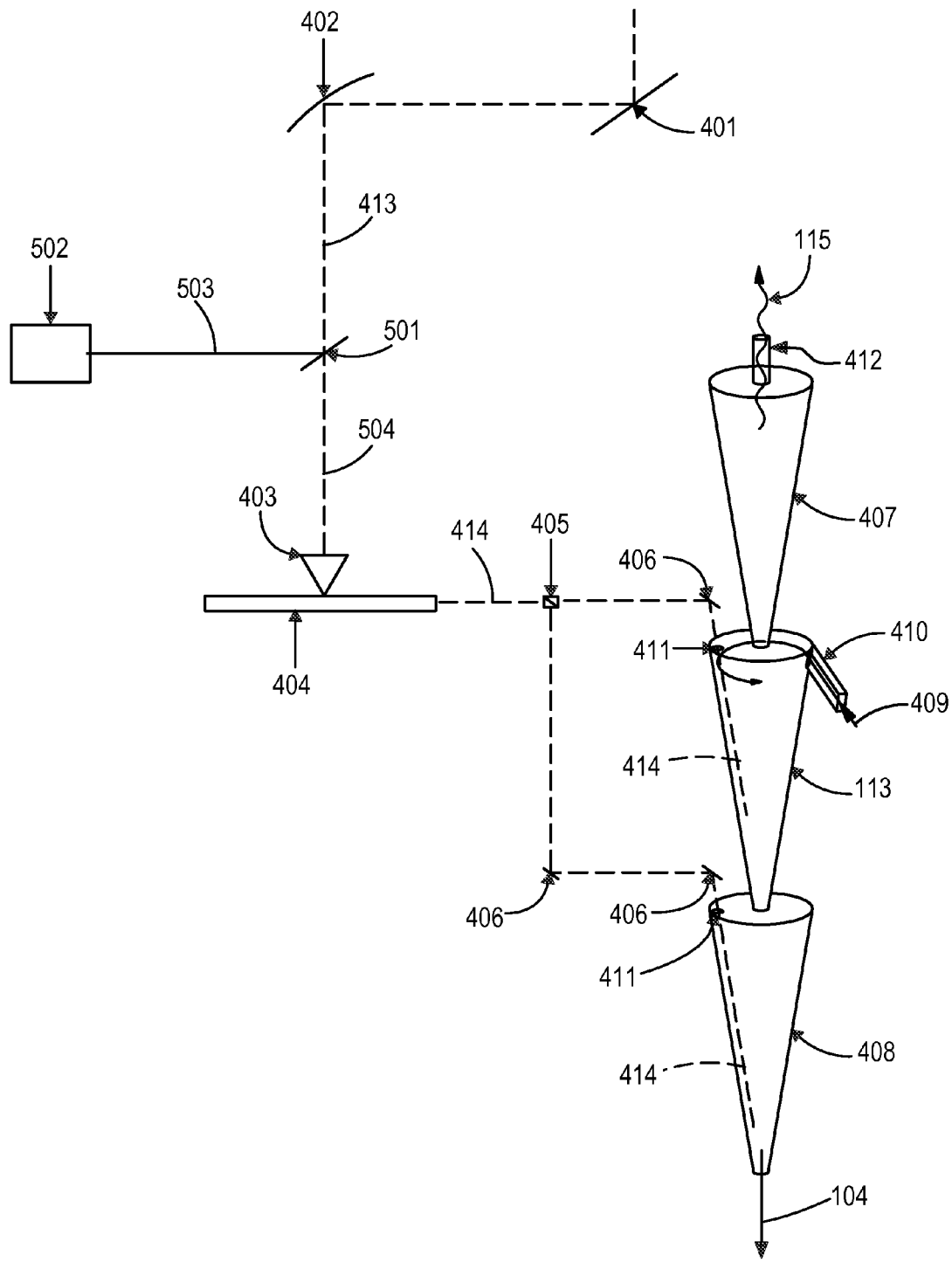
Figure 6:
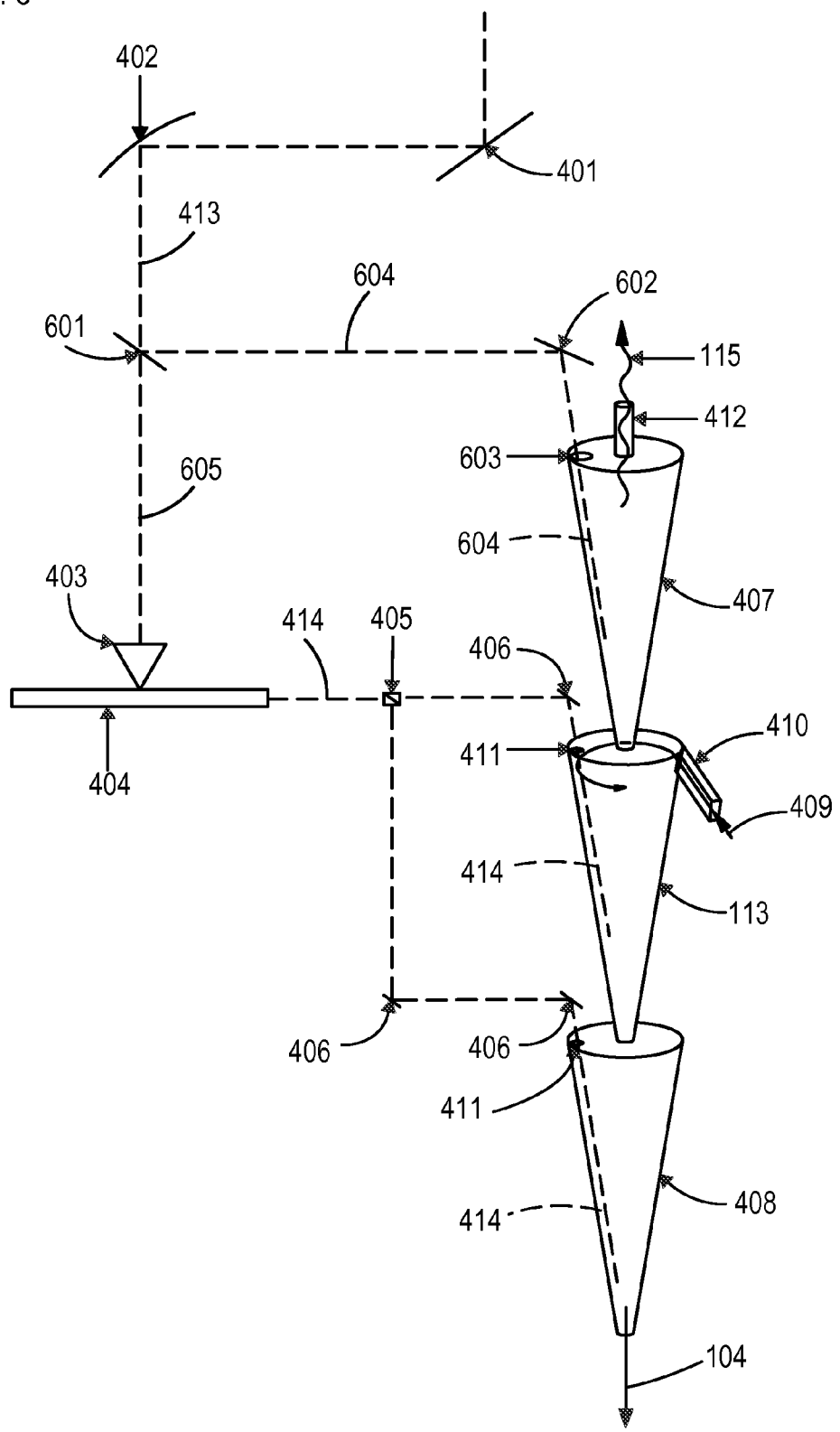

The aqueous phase of pure, solvated oxidized reductant passes from the region 205 of the separation tank 204, along a flow line 207 and to the dehydrator 208. The solvated, oxidized reductant is dehydrated in the dehydrator 208, with the liquid phase 209 sitting atop the solid phase 210. The oxidized reductant is preferably both dried and heated in the dehydrator 208. Whether dehydrated by batch or continuous process, the solid oxidized reductant 210 after dehydrating is passed along a flow line 108 into a single or several successive centripetal, counter-flowing vortex reduction separators 113. More than one vortex separator 113 may be used in succession, as shown in FIGS. 4, 5 and 6. Preferably, an inert gas is passed along a flow line 117 and into the separator 113 to provide an inert environment in which the dried oxidized reductant is exposed to eloctromagnetic radiation 119. The oxidized reductant is reduced after sufficient exposure to electromagnetic radiation 119. Oxygen and the inert gas are exhausted through the vortex or fine-particle end of the vortex separator 113, and pass through the flow line 115 and to the gas separator 116. A fraction of the gasses are passed from the dense end of the vortex separator 113, through a flow line 114 and to the gas separator 116. The reductant passes out the dense end of the vortex separator 113 and through the flow line 104 for use again in the combustion chamber 105. The gas separator 116 separates out purified inert gas which exits through the flow line 117 for re-use in the vortex separator 113, and oxygen which exits through the flow line 118 as a product of the system.

Figure 3:
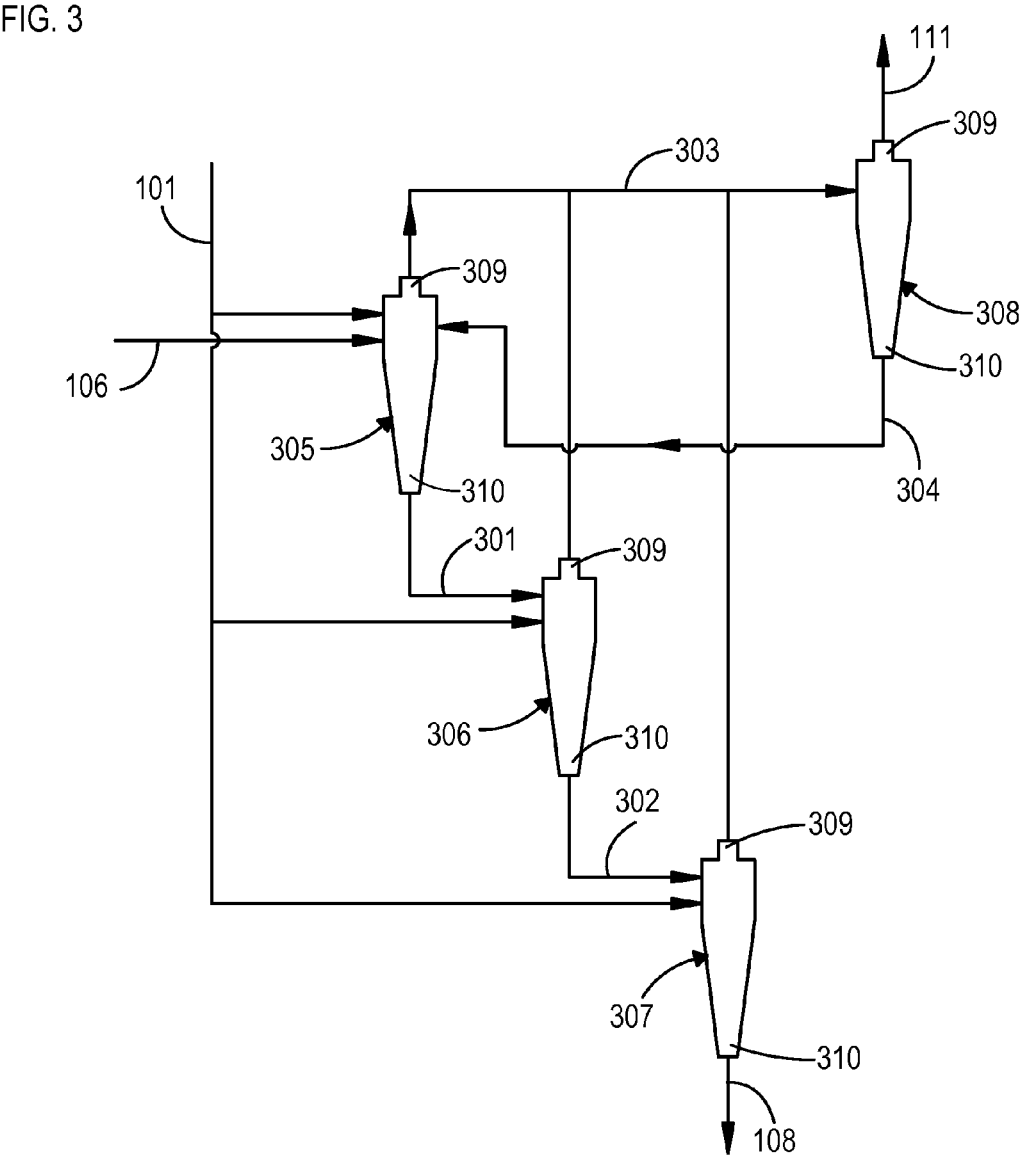

FIG. 3 is a schematic diagram an apparatus of one embodiment of the present invention employing four or more counter-flowing vortex tube separators in succession, such as may be used with apparatus 100 of FIG. 1 and apparatus 200 of FIG. 2. Several counter-flowing vortex tube mixture separators 305-308 successively purify the exhaust of the combustion chamber 105 (shown in FIGS. 1 and 2) passing from a flow line 106. The combustion chamber exhaust from flow line 106 is introduced tangentially into the first separator 305. The carbon dioxide from the flow line 101 is introduced in parallel into each of the vortex separators 305-307 for providing selected pressures in the separators 305-307. Partially purified carbon monoxide gas, carbon dioxide gas, and elemental carbon powders exit the ends 309 of the vortex separators 305, 306 and 307, and pass along the flow line 303 into the secondary fine-exhaust separator 308. The course exhaust from the vortex separator 308 passes through the flow line 304 and back into the first vortex separator 305. Once purified, carbon powder and gases leave the system through the flow line 111. The more dense oxidized reductant exits the lower end 310 of the separator 308 and passes through a flow line 304 and is reintroduced to the separator 305. The denser, partially purified oxidized reductant provides a coarse-exhaust which exits the bottoms 310 of the vortex separators 305 and 306, and passes along the flow lines 301 and 302. The flow line 302 passed into a final vortex separator 307. At the coarse-exhaust 310 of the final separator 307, the dense oxidized reductant passes through a flow line 108 for reduction in the separator 113 of FIGS. 1 and 2. Carbon dioxide gas is pumped down line 101 into each separator 107 to maintain a pressure gradient from injection to final purified outflows in lines 108 and 111. In accordance with the present invention, there may be fewer or more than three coarse-exhaust separators and one or more fine-exhaust purification stages.

FIG. 4 is a schematic diagram of a process and apparatus of another embodiment of the present invention employing sunlight to pump a laser for use to provide electromagnetic radiation 119 for the counter-flowing vortex separators 113, 407 and 408. Mirrors 401 and 402 direct light 413 into a compound parabolic collector 403, which focuses the directed light onto a laser medium 404, pumping the laser medium 404 to provide a coherent light 414, or laser beam 414. Preferably, the angle and geometry of the laser beam 414 are variable. The laser beam provides coherent light 414 which is directed to a beam splitter 405. Split light is directed by mirrors 406 through optical ports 411 and into one or several centripetal vortex separators 113 and 408. A mixture of inert-gas and fluidized oxidized reductant 409 are inserted tangentially along a path 410 into the centripetal vortex separator 113, where the oxidized reductant crosses the path of coherent light 414 at which point a certain portion is reduced by the light into reductant and oxygen gas. The mixture 115 of inert gas and oxygen gas mostly exit through port 412, from which they are sent to the gas mixture separator 116 of FIGS. 1 and 2. The oxidized and reduced reductant moves successively down the chain of one, three, or more vortex separators 113 and 408 until the oxidized reductant is completely reduced by light, and the reductant exits along with a fraction of the gasses along a flow path 104. The centripetal separator 407 provides further separation for oxidized reductant flowing from the separator 113 with freed oxygen.

FIG. 5 illustrates a schematic diagram of an apparatus according to one embodiment of the present invention for use with the apparatus 100 and the apparatus 200 of FIGS. 1 and 2, employing sunlight that is split by a dichroic mirror 501 to both pump a laser 404 and power a boiler or photovoltaic 502. In this particular embodiment, and counter-flowing vortex separators 407, 113 and 408 are used for separating a combustion products. Mirrors 401 and 402 direct light 413 to a dichroic mirror 501, where a bandwidth is reflected along a path 503 to a photovoltaic and/or boiler 502, and another bandwidth is passed along a path 504 to a compound parabolic collector 403. The parabolic collector 403 focuses the light to pump the enclosed laser medium 404. Light from the medium 404 is directed coherent light 414 which passes to the beam splitter 405. From the beam splitter 405, light is directed to mirrors 406, and then by mirrors 406 through optical ports 411 and into one or several centripetal vortex separators 113 and 408. The inert-gas and fluidized oxidized reductant 409 are inserted tangentially 410 into a centripetal vortex separator 113, where the oxidized reductant crosses the path of coherent light 414, at which point a certain portion is reduced by the light into reductant and oxygen gas. A mixture 115 of inert gas and oxygen gas mostly exit through port 412, from which they are sent to the gas mixture separator 116 of FIGS. 1 and 2. The oxidized and reduced reductant moves successively down the chain of one, three, or more vortex separators 113 and 408 until the oxidized reductant is completely reduced by light 414, and the reductant exits along with a fraction of the gasses along the flow path 104 for reuse in the combustion chamber 105 of FIGS. 1 and 2. The centripetal separator 407 provides further separation for oxidized reductant flowing from the separator 113 with freed oxygen.

FIG. 6 is a schematic diagram of an apparatus according to one embodiment of the present invention for use with the apparatus 100 and the apparatus 200 of FIGS. 1 and 2, employing sunlight which is split by a dichroic mirror 601 to both pump a laser 404 and to be directed into the counter-flowing vortex separator 407. The mirrors 401 and 402 direct sun light 413 to the dichroic mirror 601, where a bandwidth 604 is reflected to a mirror 602 that passes light through an optical port 603 and into the vortex separator 407. Another bandwidth of the light is passed along the path 605 to a compound parabolic collector 403 which pumps an enclosed laser medium 404. The resulting coherent light 414 is directed to a beam splitter 405, which directs the light to the mirros 406. The light is directed by mirrors 406 through optical ports 411 and into the centripetal vortex separators 113 and 408. The inert-gas and fluidized oxidized reductant 409 are inserted tangentially 410 into the centripetal vortex separator 113, where the oxidized reductant crosses the path of coherent light 414, at which point a certain portion is reduced by the light into reductant and oxygen gas. A mixture 115 of inert gas and oxygen gas mostly exits through port 412, from which they are sent to the gas mixture separator 116 of FIGS. 1 and 2. The oxidized and reduced reductant moves successively down the chain of one, three, or more vortex separators 407, 113 and 408, until the oxidized reductant is completely reduced by light, and the reductant exits along with a fraction of the gasses along flow path 104.

Preferably, the centripetal vortex separators of FIGS. 1 through 6 have reflective interior surfaces, similar to a conventional compound parabolic collector, to bounce light downwards. This could involve a glass or coated surface and mirrored material beneath to keep the mirror from becoming scratched by fast-moving powder, or a strong and polished surface with no coating. The entirety of the separators may be water-jacketed as a heat sink, with inlets for input/output.

The preferred laser medium 404 of FIGS. 4, 5 and 6 is a Yttrium-Aluminum garnet laser, doped with Neodymium 3+ cation and Chromium 3+ cation (Nd3+:Cr3+:YAG ceramic laser). The enclosure may include one or several ceramic laser mediums, arranged, pumped and cooled according to angles, proportions and means known to those skilled in the art. The laser 404 is preferably water-cooled. Preferably, both the remaining light and the heated reductant and gas are used to provide heat for a heat exchanger or any light is passed light absorber. Steam is used to drive a turbine, or heat is used to drive a Sterling engine.

Figure 7:
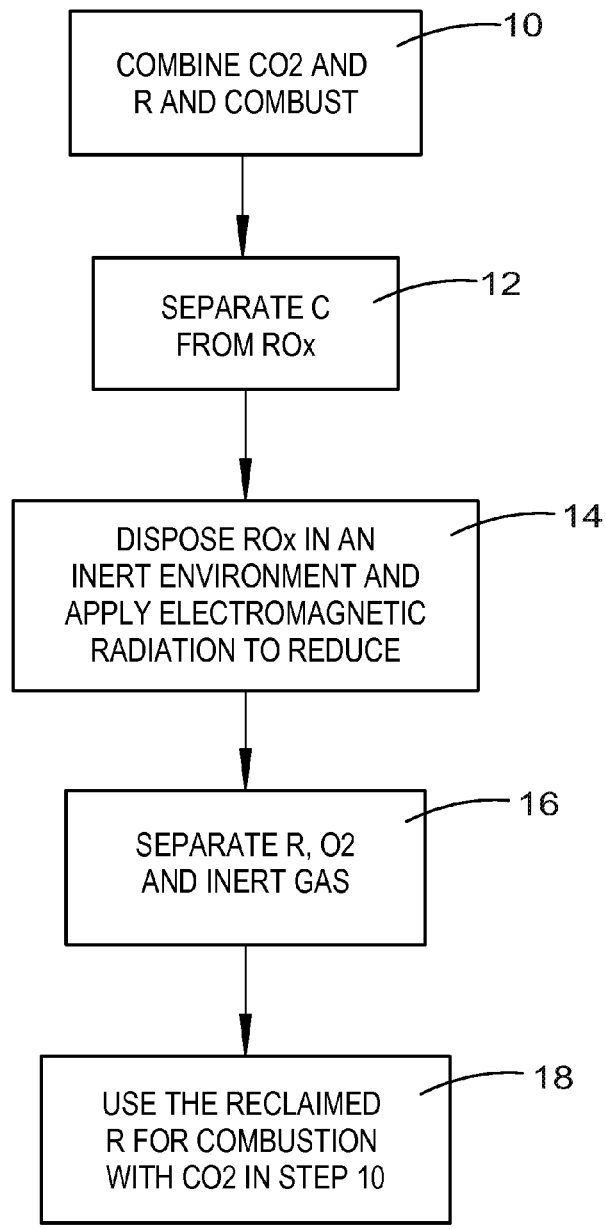

FIG. 7 is a flow chart depicting a process for sequestering carbon dioxide in accordance with the present invention. In step 10 carbon dioxide and a reductant are combined and then combusted, and oxygen from the carbon dioxode combines with the reductant according to the following equation:

$$CO2+R \rightarrow C+ROx \qquad \text{[Equation I]}$$

The reductant is preferably a metal, such as Magnesium, Aluminum, Lithium and Boron, and during combustion metal oxides ("MOx" or MgOx) are formed, represented by ROx in Equation I.

In step 12 the produced carbon is separated from the oxidized reductant (ROx). It should also be noted that not all carbon dioxide will generally be fully reduced in the first pass, such that some carbon dioxide and carbon monoxide will remain. The carbon dioxide and carbon monoxide are separated from the produced carbon and oxidized reductant, and then will again be passed through, or looped back through, a combustion chamber for again combusting with the reductant to further reduce any remaining carbon dioxide and carbon monoxide.

In step 14 the oxidized reductant is placed in an inert environment, preferably by mixing with an inert gas. While in the inert environment, electromagnetic radiation is applied to the oxidized reductant to reduce the oxidized reductant according to the equation:

$$ROx+Energy \rightarrow R+xO \qquad \text{[Equation II]}$$

The electromagnetic radiation is preferably light of a frequency, or wavelength, strongly absorbed by oxygen, such that the oxygen will absorb the electromagnetic radiation and become free from the reductant, and remain free if rapidly cooled in the inert environment. Wavelengths of light strongly absorbed by oxygen include 577 nanometers, 630 nanometers and 1064 nanometers, as well as other frequencies. A Yttrium aluminum garnet ("YAG") laser emits light at 1064 nm, and is preferably used to focus intensified electromagnetic radiation in the form of light on the oxygen in the ROx, which preferably an oxidized metal ("MOx"), such as magnesium oxide ("MgO").

In step 16 the freed reductant is separated from the inert gas and the oxygen ($O_2$). In step 18 the reclaimed reductant is re-used, in step 10 for combusting with carbon dioxide.

The present invention provides advantages of a method and apparatus for sequestering carbon dioxide, using a reductant which is oxidized by the oxygen in the carbon dioxide. Oxidizing the reductant frees carbon from the carbon dioxide to allow the carbon to be separated from the oxidized reductant by mechanical means. After separation from the carbon, the oxidized reductant is itself reduced, preferably by exposure to electromagnetic energy in an inert environment. Metal is preferably used as a reductant, with magnesium being the preferred metal. The electromagnetic energy is preferably light provided by a YAG laser at a wavelength of 1064 nm, and is generated using solar energy.

Although the preferred embodiment has been described in detail, it should be understood that various changes, substitutions and alterations can be made therein without departing from the spirit and scope of the invention as defined by the appended claims.

What is claimed is:

1. A method for carbon dioxide sequestration comprising the steps of:
   feeding carbon dioxide and a reductant into a combustion chamber, wherein the carbon dioxide and the reductant react in the combustion chamber, such that the reductant forms an oxide with oxygen from the carbon dioxide to form an oxidized reductant and the carbon dioxide is reduced to carbon;
   exhausting the oxidized reductant and the carbon from the combustion chamber;
   then, separating the oxidized reductant from the carbon;

reducing the oxidized reductant to form reclaimed reductant;

feeding the reclaimed reductant into the combustion chamber to provide the reductant for reducing the carbon dioxide; and wherein the step of separating the oxidized reductant from carbon further comprises the steps of:

disposing in a vortex separator the oxidized reductant and the carbon exhausted from the combustion chamber; and separately removing the carbon and the oxidized reductant from the vortex separator in different flow lines.

2. The method for carbon dioxide sequestration according to claim 1, wherein the step of reducing the oxidized reductant further comprises the steps of:

disposing the oxidized reductant in an inert environment;

exposing the oxidized reductant in the inert environment to electromagnetic radiation of a wavelength for freeing oxygen from the oxidized reductant to produce reclaimed reductant and freed oxygen; and separating the reclaimed reductant from the freed oxygen and the inert environment.

3. The method for carbon dioxide sequestration according to claim 2, wherein the electromagnetic radiation is provided by light having a wavelength which is readily absorbed by oxygen.

4. The method for carbon dioxide sequestration according to claim 3, wherein the light has a wavelength of at least one of 577, 630 or 1064 nanometers.

5. The method for carbon dioxide sequestration according to claim 2, wherein the electromagnetic radiation is provided by a Yttrium aluminum garnet (YAG) laser.

6. The method for carbon dioxide sequestration according to claim 2, wherein the step of disposing the oxidized reductant in an inert environment comprises providing an inert gas and mixing the oxidized reductant with the inert gas.

7. The method for carbon dioxide sequestration according to claim 6, wherein a mixture of the inert gas and the oxidized reductant flow in the vortex separator, and the oxidized reductant is exposed to the electromagnetic radiation in the vortex separator.

8. The method for carbon dioxide sequestration according to claim 1, wherein the step of separating the oxidized reductant from carbon further comprises the steps of:

disposing in a separation tank the oxidized reductant and the carbon exhausted from the combustion chamber;

disposing a liquid in the separation tank which solvates the oxidized reductant, wherein the carbon floats above the liquid;

separating the carbon from the oxidized reductant which is solvated; and removing the liquid from the oxidized reductant.

9. A method for carbon dioxide sequestration comprising the steps of:

feeding carbon dioxide and a metal into a combustion chamber, wherein the carbon dioxide and the metal react in the combustion chamber, such that the metal forms an oxide with oxygen from the carbon dioxide to form an oxidized metal and the carbon dioxide is reduced to carbon;

exhausting the oxidized metal and the carbon from the combustion chamber;

then, separating the oxidized metal from the carbon;

reducing the oxidized metal to form reclaimed metal;

feeding the reclaimed metal into the combustion chamber to provide the metal for reducing the carbon dioxide;

wherein the step of disposing the oxidized metal in an inert environment comprises providing an inert gas and mixing the oxidized metal with the inert gas; and wherein a mixture of the inert gas and the oxidized metal flow in a vortex separator, and the oxidized metal is exposed to electromagnetic radiation in the vortex separator.

10. The method for carbon dioxide sequestration according to claim 9, wherein the step of reducing the oxidized metal further comprises the steps of:

disposing the oxidized metal in an inert environment;

exposing the oxidized metal in the inert environment to the electromagnetic radiation which is of a wavelength for freeing oxygen from the oxidized metal to produce reclaimed metal and freed oxygen; and separating the reclaimed metal from the freed oxygen and the inert environment.

11. The method for carbon dioxide sequestration according to claim 10, wherein the electromagnetic radiation is provided by light having a wavelength which is readily absorbed by oxygen.

12. The method for carbon dioxide sequestration according to claim 11, wherein the light has a wavelength of at least one of 577, 630 or 1064 nanometers.

13. The method for carbon dioxide sequestration according to claim 10, wherein the electromagnetic radiation is provided by a Yttrium aluminum garnet (YAG) laser.

14. The method for carbon dioxide sequestration according to claim 9, wherein the step of separating the oxidized metal from carbon further comprises the steps of:

disposing in a separation tank the oxidized metal and the carbon exhausted from the combustion chamber;

disposing a liquid in the separation tank which solvates the oxidized metal, wherein the carbon floats above the liquid;

separating the carbon from the oxidized metal which is solvated; and removing the liquid from the oxidized metal.

15. The method for carbon dioxide sequestration according to claim 9, wherein the step of separating the oxidized metal from carbon further comprises the steps of:

disposing in a separation tank the oxidized metal and the carbon exhausted from the combustion chamber;

disposing water in the separation tank which solvates the oxidized metal, wherein the carbon floats above the water;

separating the carbon from the oxidized metal which is solvated; and drying the oxidized metal which is solvated to remove the water from the oxidized metal.

16. A method for carbon dioxide sequestration comprising the steps of:

feeding carbon dioxide and a metal into a combustion chamber, wherein the carbon dioxide and the metal react in the combustion chamber, such that the metal forms an oxide with oxygen from the carbon dioxide to form an oxidized metal and the carbon dioxide is reduced to carbon;

exhausting the oxidized metal and the carbon from the combustion chamber;

then, separating the oxidized metal from the carbon;

reducing the oxidized metal to form reclaimed metal;

feeding the reclaimed metal into the combustion chamber to provide the metal for reducing the carbon dioxide;

wherein the step of separating the oxidized metal from carbon further comprises the steps of:

disposing in a vortex separator the oxidized metal and the carbon exhausted from the combustion chamber; and
separately removing the carbon and the oxidized metal from the vortex separator in different flow lines.

* * * * *